United States Patent
Bunel et al.

(10) Patent No.: US 9,500,371 B2
(45) Date of Patent: Nov. 22, 2016

(54) DEVICE FOR INJECTING AIR AND FUEL INTO A COMBUSTION CHAMBER OF A TURBINE ENGINE

(71) Applicant: SNECMA, Paris (FR)

(72) Inventors: Jacques Marcel Arthur Bunel, Thiais (FR); Frederic Marius Mathieu, Corbeil Essones (FR); Gilles Ulryck, Ballancourt sur Essonne (FR)

(73) Assignee: SNECMA, Paris (FR)

( * ) Notice: Subject to any disclaimer, the term of this patent is extended or adjusted under 35 U.S.C. 154(b) by 291 days.

(21) Appl. No.: 14/378,211

(22) PCT Filed: Feb. 8, 2013

(86) PCT No.: PCT/FR2013/050264
§ 371 (c)(1),
(2) Date: Aug. 12, 2014

(87) PCT Pub. No.: WO2013/121132
PCT Pub. Date: Aug. 22, 2013

(65) Prior Publication Data
US 2015/0059346 A1    Mar. 5, 2015

(30) Foreign Application Priority Data
Feb. 15, 2012  (FR) ...................... 12 51401

(51) Int. Cl.
 *F23R 3/28*   (2006.01)
 *F02C 7/22*   (2006.01)
 *F23R 3/14*   (2006.01)

(52) U.S. Cl.
 CPC ............. *F23R 3/286* (2013.01); *F02C 7/22* (2013.01); *F23R 3/14* (2013.01); *F23R 3/283* (2013.01); *F23D 2211/00* (2013.01); *F23R 2900/00005* (2013.01); *F23R 2900/00017* (2013.01)

(58) Field of Classification Search
 CPC ........ F23R 3/286; F23R 3/283; F23R 3/002; F23R 3/14; F23R 3/60; F23R 2900/00017; F02C 7/22; F02C 7/20; F05D 2260/30
 See application file for complete search history.

(56) References Cited

U.S. PATENT DOCUMENTS 6,314,739 B1 * 11/2001 Howell ................ F01D 11/005
                                                    60/748
7,823,392 B2 * 11/2010 Locatelli .................. F23R 3/14
                                                    60/752

(Continued)

FOREIGN PATENT DOCUMENTS

| | | |
|---|---|---|
| EP | 1 873 455 | 1/2008 |
| FR | 2 952 166 | 5/2011 |
| FR | 2 958 015 | 9/2011 |

OTHER PUBLICATIONS

International Search Report Issued Aug. 9, 2013 in PCT/FR13/050264 filed Feb. 8, 2014.

*Primary Examiner* — Andrew Nguyen
(74) *Attorney, Agent, or Firm* — Oblon, McClelland, Maier & Neustadt, L.L.P.

(57) ABSTRACT

A device for injecting air and fuel into a combustion chamber of a turbine engine, the device including a fuel injector, at least one first element mounted on the fuel injector, and at least one second element mounted on an end wall of the combustion chamber. The first element includes a radial rim that is movable in a radial groove of the second element, which groove is defined by a sheath and by a closure ring welded to an inside of the sheath. The closure ring includes a radial wall and a cylindrical rim extending from the radially outer periphery of the radial wall towards a radial wall of the sheath and bearing via its corresponding free end against the radial wall of the sheath.

8 Claims, 4 Drawing Sheets

(56) References Cited

U.S. PATENT DOCUMENTS

| | | | |
|---|---|---|---|
| 8,261,556 B2 * | 9/2012 | Audin | F23R 3/002 29/890.02 |
| 2003/0010034 A1 * | 1/2003 | Baudoin | F23R 3/286 60/740 |
| 2007/0084215 A1 | 4/2007 | Hernandez et al. | |
| 2008/0000234 A1 * | 1/2008 | Commaret | F23D 11/107 60/748 |
| 2008/0236169 A1 | 10/2008 | Hawie et al. | |
| 2011/0271682 A1 * | 11/2011 | Sandelis | F23C 7/004 60/737 |
| 2012/0204567 A1 | 8/2012 | Hernandez et al. | |

\* cited by examiner

DEVICE FOR INJECTING AIR AND FUEL INTO A COMBUSTION CHAMBER OF A TURBINE ENGINE

The present invention relates to a device for injecting air and fuel into a combustion chamber of a turbine engine, such as an airplane turboprop or turbojet.

Patent application FR 2 958 015 in the name of the Applicant discloses a device for injecting air and fuel that comprises a central fuel injector surrounded by a first annular wall forming a first Venturi and defining the outside of a first air admission channel around the central injector. A second annular wall surrounds the first wall and forms a Venturi situated downstream from the first Venturi. A second air admission channel is defined by the first and second annular walls. Finally, a bowl surrounds the second annular wall and co-operates therewith to define a peripheral annular channel into which there opens out air feed means and orifices for ejecting fuel from a peripheral or multipoint injector.

The radially outer periphery of the bowl includes a radial rim movably mounted in a radial groove defined by a sheath fastened to an end wall of the combustion chamber and by a closure ring welded to the sheath.

Radial movement of the rim in the groove serves to compensate for relative movements between the combustion chamber and the injector together with the casing on which it is fastened. Such movements appear in operation because of differential expansions between the various elements of the turbine engine.

The sheath has a radial wall and a cylindrical rim extending axially upstream from the radially outer periphery of the radial wall. The rim has an upstream portion of inside diameter corresponding substantially to the outside diameter of the closure ring, and a downstream portion of smaller inside diameter forming a shoulder that acts as a bearing surface for the closure ring. The axial size of the downstream portion forming the shoulder defines the width of the above-mentioned groove.

The closure ring is mounted in the upstream portion of the rim. This ring has a radial wall with an outer periphery that includes a cylindrical rim extending axially downstream. The radial wall of the closure ring bears against the shoulder of the sheath.

The downstream free edges of the rims of the sheath and of the closure ring are fastened to each other by welding, and more particularly by means of four weld beads that are regularly distributed around the entire circumference.

Although such a structure presents a lifetime that is considerable, it also presents weight and size that are relatively great.

A particular object of the invention is to provide a solution to this problem that is simple, effective, and inexpensive.

To this end, the invention provides a device for injecting air and fuel into a combustion chamber of a turbine engine such as an airplane turboprop or turbojet, the device comprising a fuel injector, at least one first element mounted on the fuel injector or connected thereto, and at least one second element for mounting on an end wall of the combustion chamber, the first element having a radial rim movably mounted in a radial groove of the second element, said groove being defined firstly by a sheath having a radial wall with an outer periphery including a cylindrical rim, and secondly by a closure ring mounted inside the cylindrical rim of the sheath, the sheath and the closure ring being fastened to each other, e.g. by welding, the device being characterized in that the closure ring includes a radial wall and a cylindrical rim extending from the radially outer periphery of the radial wall towards the radial wall of the sheath and bearing via its corresponding free end against the radial wall of the sheath.

The invention thus proposes modifying the direction in which the outer peripheral rim of the closure ring extends so that it comes to bear against the radial wall of the sheath. The sheath then does not need to have a shoulder and it is possible to shorten the axial length of its cylindrical rim so as to reduce the weight and the size of the assembly while guaranteeing a lifetime that is similar to that of the above-described prior art. Such a structure also facilitates the flow of the air stream that is to be mixed with the fuel.

According to a characteristic of the invention, the cylindrical rim of the closure ring extends axially on either side of its radial wall.

When the rims of the sheath and of the closure ring are welded together, the weld beads extend axially in the interface or junction zone between the rims. The above-mentioned characteristics make it possible in particular for the closure ring to conserve a rim of length that is sufficient to have robust welding while having a radial wall that is relatively fine, the width of the groove being imposed by the length of the radial rim of the first element.

The free end of the cylindrical rim of the sheath may include a radial surface extending in line with a radial surface of the closure ring, at least one weld bead extending in the junction zone between the sheath and the closure ring from the above-mentioned radial surfaces.

Preferably, at least one inspection hole for inspecting the weld bead passes through the cylindrical rim of the sheath so as to open out into the junction zone between the sheath and the closure ring, facing the weld bead.

In the prior art, weld quality is verified by destructive inspections. The above-mentioned inspection hole enables the quality of the welds that have been made to be inspected easily and in non-destructive manner. The penetration of the weld into the interface or junction zone between the rims of the sheaths and of the closure ring can be observed and measured directly through the inspection hole.

The distance between the free end of the cylindrical rim of the sheath and the inspection hole lies in the range 1 millimeter (mm) to 2 mm.

By way of example, the weld should penetrate into the interface or junction zone between the rims of the sheath and the closure ring by at least 1.6 mm in the applications intended by the Applicant.

Advantageously, the sheath and the closure ring are fastened to each other by at least four weld beads that are regularly distributed around the circumference, each extending circumferentially over a distance lying in the range 5 mm to 15 mm, and preferably over a distance lying in the range 7 mm to 12 mm.

According to another characteristic of the invention, the cylindrical rim of the closure ring has length lying in the range 2 mm to 5 mm.

The first element may include at least one annular wall surrounding the injector and defining at least one annular channel for admitting air around the injector.

In a variant, the first element may be a guide ring mounted around the injector, as in patent application FR 2 925 146 in the name of the Applicant.

The invention also provides a turbine engine, such as an airplane turboprop or turbojet, including a combustion chamber having at least one air and fuel injection device of the above-specified type.

The invention can be better understood and other details, characteristics, and advantages appear on reading the following description made by way of non-limiting example and with reference to the accompanying drawings, in which:

FIG. 1 shows an annular combustion chamber 1 of a turbine engine such as an airplane turboprop or turbojet, the combustion chamber having prior art devices 2 for injecting air and fuel.

Figure 1:
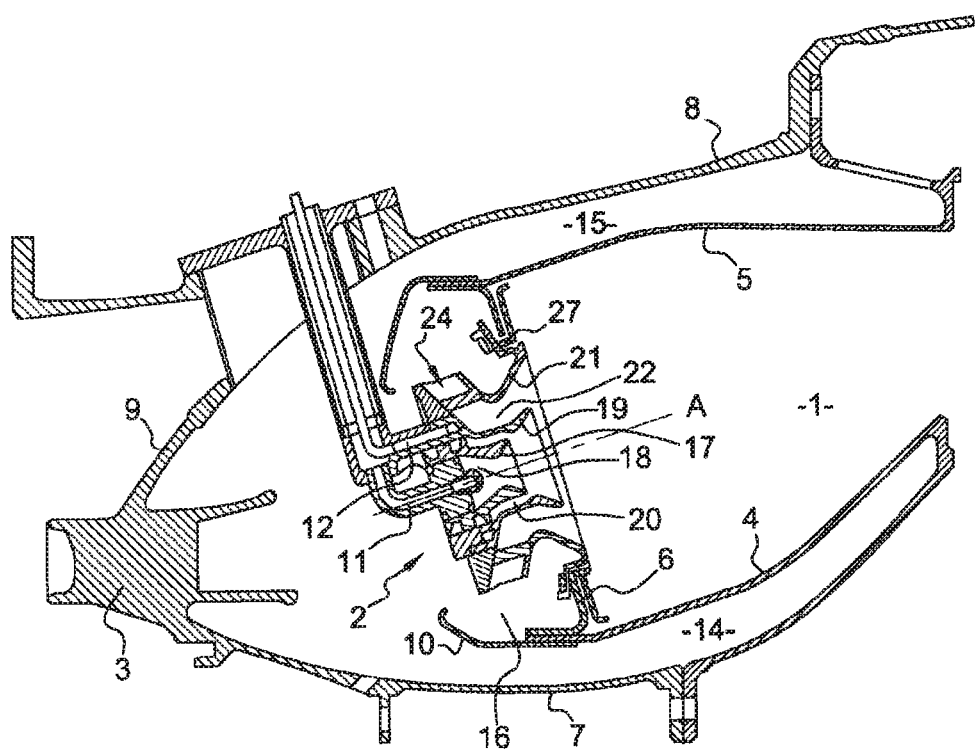
FIG. 1 is a half-view in axial section of an annular combustion chamber fitted with air and fuel injection devices of the prior art.

The combustion chamber 1 is arranged at the outlet from a diffuser 3, itself situated at the outlet from a compressor (not shown). The chamber 1 has an inner wall 4 forming a surface of revolution and an outer wall 5 forming a surface of revolution that are connected together upstream by an annular chamber end wall 6 and that are fastened downstream via inner and outer flanges respectively to an internal frustoconical shroud 7 of the diffuser 3 and to an outer casing 8 of the combustion chamber, the upstream end of the casing being connected to an outer frustoconical shroud 9 of the diffuser 3.

An annular fairing 10 is fastened to the upstream ends of the walls 4 and 5 of the chamber 1 and has air-passing orifices in alignment with openings in the chamber end wall 6 having devices 2 mounted therein for injecting a mixture of air and fuel into the chamber 1, the air coming from the diffuser 3 and the fuel being conveyed by injectors 11, 12 fastened to the outer casing and regularly distributed around the axis of the chamber. Each injector 11 has a fuel injection head 13 in alignment on the axis A of the corresponding opening.

A portion of the air flow delivered by the compressor and leaving the diffuser 3 feeds inner and outer annular ducts 14 and 15 passing around the combustion chamber 1. The remainder of the air flow penetrates into the enclosure 16 defined by the fairing 10, passes into the injection devices 2, and is then mixed with the fuel brought in by the injectors 11, 12 prior to being sprayed into the combustion chamber 1.

Figure 2:
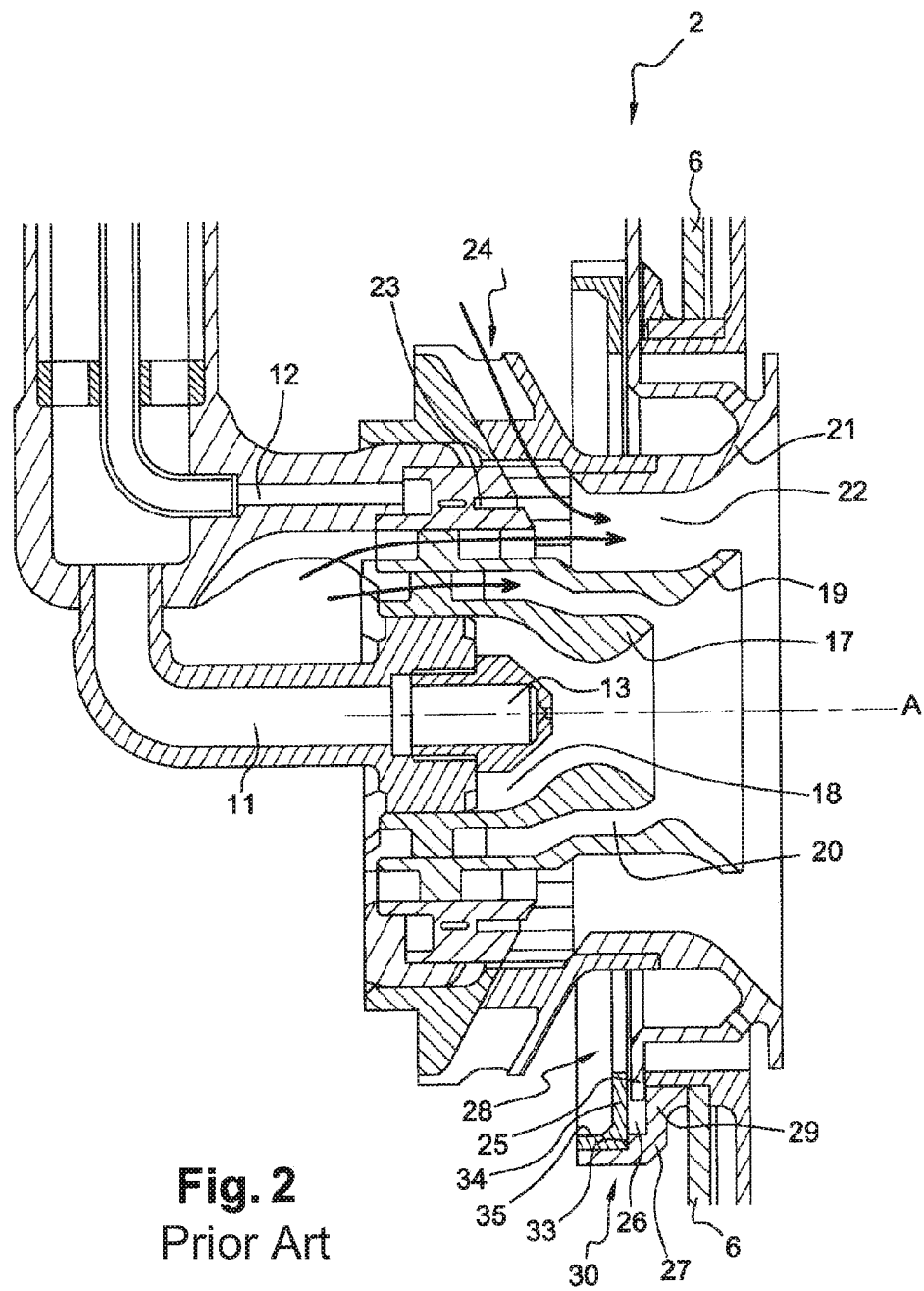
FIGS. 2 and 3 are longitudinal section views of portions of the prior art air and fuel injection device.

As can be seen better in FIG. 2, each air and fuel injection device 2 comprises a central fuel injector 11 surrounded by a first annular wall 17 forming a first Venturi and defining the outside of a first air admission channel 18 around the central injector 11. A second annular wall 19 surrounds the first wall 17 and forms a Venturi downstream from the first Venturi. A second air admission channel 20 is defined by the first and second annular walls 17 and 19. Finally, a bowl 21 surrounds the second annular wall 19 and co-operates therewith to define a peripheral annular channel 22 into which there open out air feed means 24 and fuel ejection orifices 23 of a peripheral or multipoint injector 12.

The channels 18, 20 and the air feed means 24 conventionally include fins for imparting swirling motion on the air streams passing through them (represented by arrows) enhancing uniform mixing of air and fuel.

The radially outer periphery of the bowl 21 has a radial rim 25 movably mounted in a radial groove 26 defined by a sheath 27 fastened to the end wall 6 of the combustion chamber 1 and by a closure ring 28 welded to the sheath 27.

Radial movement of the rim 25 in the groove 26 serves to compensate for relative movements between the combustion chamber 1 and the injectors 11, 12 together with the casing 8 on which they are fastened. Such movements occur in operation because of differential expansions between the various elements of the turbine engine.

Figure 3:
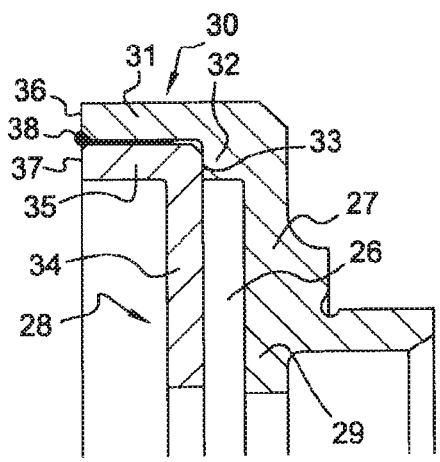

As can be seen more clearly in FIG. 3, the sheath 27 has a radial wall 29 and a cylindrical rim 30 extending axially upstream from the radially outer periphery of the radial wall 29. The rim 23 has an upstream portion 31 (FIG. 3) of inside diameter that corresponds substantially to the outside diameter of the closure ring 28, and a downstream portion 32 of smaller inside diameter, forming a shoulder 33 serving as a bearing surface for the closure ring 28. The axial size of the downstream portion 32 forming the shoulder 33 defines the width of the above-mentioned groove 26.

The closure ring 28 is mounted inside the upstream portion 31 of the rim 30 and includes a radial wall 34 with its radial periphery including a cylindrical rim 35 extending axially upstream. The radial wall 34 of the closure ring 28 bears against the shoulder 33 of the sheath 27.

The free downstream edges 36, 37 of the rims 31, 35 of the sheath 27 and of the closure ring 28 are fastened together by welding, and more particularly by weld beads 38 that are regularly distributed around the circumference and that are four in number in one particular embodiment.

Although such a structure presents a long lifetime, it nevertheless presents weight and bulk that are relatively large.

Figure 4:
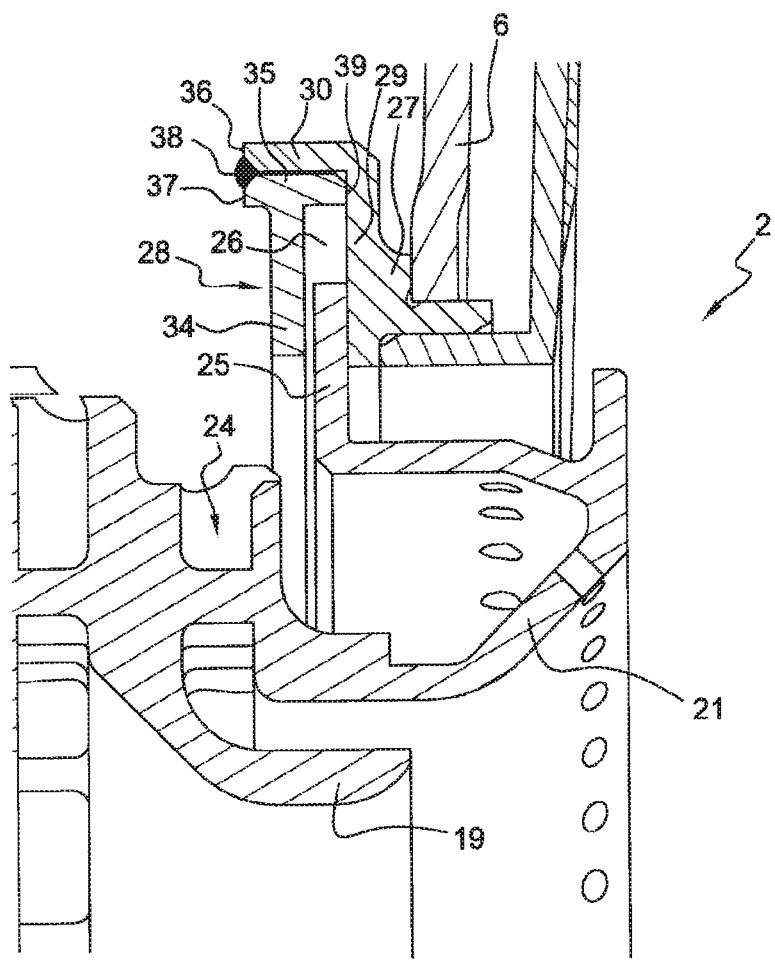
FIGS. 4 and 5 are longitudinal section views of portions of the air and fuel injection device of the invention.
Figure 5:
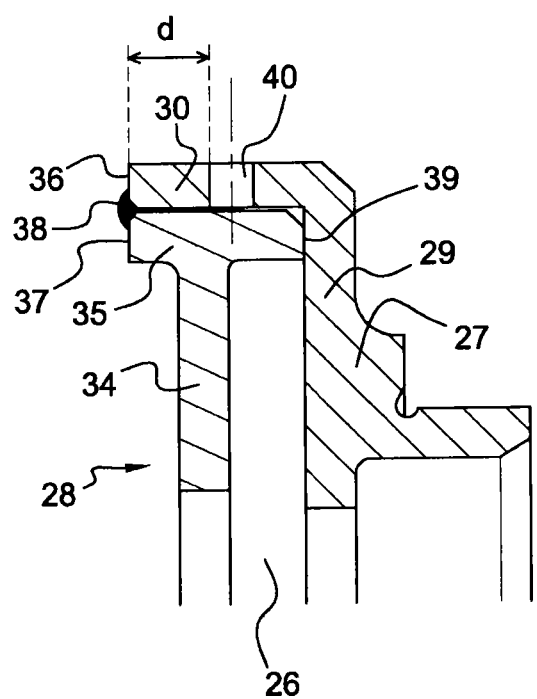

FIGS. 4 and 5 show a portion of the air and fuel injection device 2 of the invention in which the cylindrical rim 35 and the closure ring 28 extend axially on either side of the radial wall 34. The cylindrical rim 30 and the radial wall 29 of the sheath 27 also lack shoulders.

The downstream end 39 of the cylindrical rim 35 of the closure ring 28 thus bears directly against the radial wall 29 of the sheath 27.

The length of the downstream portion of the rim 35 that extends beyond the radial wall 34 is defined as a function of the width desired for the groove 26, itself a function of the thickness of the radial rim 25 of the bowl 21.

The total length of the rim 35 of the closure ring 28 corresponds to the distance between the radial wall 29 and the free end 36 of the rim 30 of the sheath 27. By way of example, this length lies in the range 2 mm to 5 mm.

In this way, the free ends 36 and 37 of the rims 30 and 35 form radial surfaces situated facing each other.

Weld beads 38 are made in the junction or interface zone between the two rims 30, 35 and they extend upstream from the free ends 36, 37 over a distance of not less than 1.6 mm, for example.

Four weld beads 38 are preferably made in this way, the beads 38 being regularly distributed around the circumference, with each of them extending circumferentially over a distance lying in the range 5 mm to 15 mm, and preferably over a distance lying in the range 7 mm to 12 mm.

Holes 40 for inspecting the weld beads 38 pass through the cylindrical rim 30 of the sheath 27 (FIG. 5), so as to open out into the junction zone between the sheath 27 and the closure ring 28, facing each weld bead 38.

The distance between the free end 36 of the cylindrical rim 30 of the sheath 27 and the hole 40 is adapted to the minimum penetration that is to be obtained for the weld beads 38, i.e. 1.6 mm in the above-described example.

Eliminating the shoulder 33 in the device 2 of the invention makes it possible to shorten the length of the rim 30, so as to reduce the size and the weight of the assembly while guaranteeing a lifetime that is similar to that of the above-described prior art. Such a structure also facilitates the flow of the air stream that is to be mixed with the fuel.

The invention claimed is:

1. A device for injecting air and fuel into a combustion chamber of a turbine engine or an airplane turboprop or a turbojet, the device comprising:
   a fuel injector;
   at least one first element mounted on the fuel injector or connected thereto; and
   at least one second element for mounting on an end wall of the combustion chamber;
   the at least one first element including a radial rim movably mounted in a radial groove of the at least one second element, the groove being defined by a sheath including a radial wall with an outer periphery including a cylindrical rim, and by a closure ring mounted inside the cylindrical rim of the sheath, the sheath and the closure ring being fastened to each other, or welded to each other,
   wherein the closure ring includes a radial wall and a cylindrical rim extending from a radially outer periphery of the radial wall of the closure ring towards the radial wall of the sheath and bearing via a corresponding free end of the cylindrical rim of the closure ring against the radial wall of the sheath, and
   wherein a free end of the cylindrical rim of the sheath includes a radial surface extending in line with a radial surface of the closure ring, at least one weld bead extending in a junction zone between the sheath and the closure ring from the radial surfaces of the closure ring and the sheath.

2. A device according to claim 1, wherein the cylindrical rim of the closure ring extends axially on either side of the radial wall of the closure ring.

3. A device according to claim 1, wherein at least one inspection hole for inspecting the weld bead passes through the cylindrical rim of the sheath to open out into the junction zone between the sheath and the closure ring, facing the weld bead.

4. A device according to claim 3, wherein a distance between the free end of the cylindrical rim of the sheath and the inspection hole is in a range of 1 mm to 2 mm.

5. A device according to claim 1, wherein the sheath and the closure ring are fastened to each other by at least four weld beads that are regularly distributed around a circumference, each extending circumferentially over a distance in a range of 5 mm to 15 mm, or over a distance in a range of 7 mm to 12 mm.

6. A device according to claim 1, wherein the cylindrical rim of the closure ring has a length in a range of 2 mm to 5 mm.

7. A device according to claim 1, wherein the at least one first element includes at least one annular wall surrounding the injector and defining at least one annular channel for admitting air around the injector.

8. A turbine engine, or an airplane turboprop, or a turbojet, comprising a combustion chamber comprising at least one air and fuel injection device according to claim 1.

* * * * *